United States Patent
Shimizu

(10) Patent No.: US 10,200,944 B2
(45) Date of Patent: Feb. 5, 2019

(54) APPARATUS AND METHOD FOR RESTRICTING COMMUNICATION OF AN INFORMATION PROCESSING APPARATUS USING ENCRYPTION STRENGTH OF A RELAY

(71) Applicant: CANON KABUSHIKI KAISHA, Tokyo (JP)

(72) Inventor: Shota Shimizu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 14/992,884

(22) Filed: Jan. 11, 2016

(65) Prior Publication Data

US 2016/0205076 A1  Jul. 14, 2016

(30) Foreign Application Priority Data

Jan. 14, 2015 (JP) .................... 2015-005333

(51) Int. Cl.
*H04W 76/10* (2018.01)
*H04W 48/20* (2009.01)
(Continued)

(52) U.S. Cl.
CPC .............. *H04W 48/20* (2013.01); *G06F 3/01* (2013.01); *H04B 7/155* (2013.01);
(Continued)

(58) Field of Classification Search
CPC ... G06F 21/608; H04L 63/0428; H04L 63/20; H04L 63/205; H04W 28/18; H04W 48/20; H04W 76/02; H04W 8/005; H04W 88/08
See application file for complete search history.

(56) References Cited

U.S. PATENT DOCUMENTS

2006/0264227 A1* 11/2006 Takahashi ........... H04L 41/0806
                                                              455/513
2010/0110921 A1*  5/2010 Famolari ............... H04W 48/17
                                                              370/252
(Continued)

FOREIGN PATENT DOCUMENTS

CN            1701565 A    11/2005
CN          102573107 A     7/2012
(Continued)

OTHER PUBLICATIONS

Joseph Davies, The Cable Guy, Wireless Group Policy Settings for Windows Vista, TechNet Magazine https://technet.microsoft.com/en-us/magazine/2007.4.cableguy (printer).aspx Jan. 7, 2016.

*Primary Examiner* — Theodore C Parsons
(74) *Attorney, Agent, or Firm* — Canon USA Inc., IP Division

(57) ABSTRACT

An information processing apparatus performs a communication using a wireless encryption method via an access point. A plurality of access points are displayed on a display unit of the information processing apparatus in a manner that one of the plurality of access points can be selected. At this time, an encryption method of a communication adopted by the access point is obtained, and it is determined whether the obtained encryption method of the access point is a predetermined encryption method. The access point determined to have a predetermined encryption strength is displayed on the display unit more preferentially than other access points.

15 Claims, 11 Drawing Sheets

(51) Int. Cl.
*H04W 48/18* (2009.01)
*H04B 7/155* (2006.01)
*H04L 29/06* (2006.01)
*G06F 3/01* (2006.01)
*H04W 8/00* (2009.01)
*H04W 88/08* (2009.01)

(52) U.S. Cl.
CPC .......... *H04L 63/0428* (2013.01); *H04L 63/20* (2013.01); *H04W 48/18* (2013.01); *H04W 76/10* (2018.02); *H04W 8/005* (2013.01); *H04W 88/08* (2013.01)

(56) References Cited

U.S. PATENT DOCUMENTS

| 2010/0309815 A1 | 12/2010 | Yepez |
| 2013/0035138 A1 | 2/2013 | Abbott |
| 2013/0097711 A1* | 4/2013 | Basavapatna ........... H04W 4/02 726/25 |
| 2014/0003407 A1* | 1/2014 | Park ...................... H04W 48/17 370/338 |
| 2015/0036539 A1* | 2/2015 | Townend ............... H04W 48/12 370/254 |
| 2016/0205076 A1* | 7/2016 | Shimizu ................. H04B 7/155 380/255 |

FOREIGN PATENT DOCUMENTS

| EP | 1542400 A2 | 6/2005 |
| EP | 2555546 A1 | 2/2013 |
| JP | 2006-005879 A | 1/2006 |
| JP | 2010-178263 A | 8/2010 |
| JP | 2012-089911 A | 5/2012 |
| JP | 2013-162323 A | 8/2013 |
| JP | 2014-179928 A | 9/2014 |

* cited by examiner

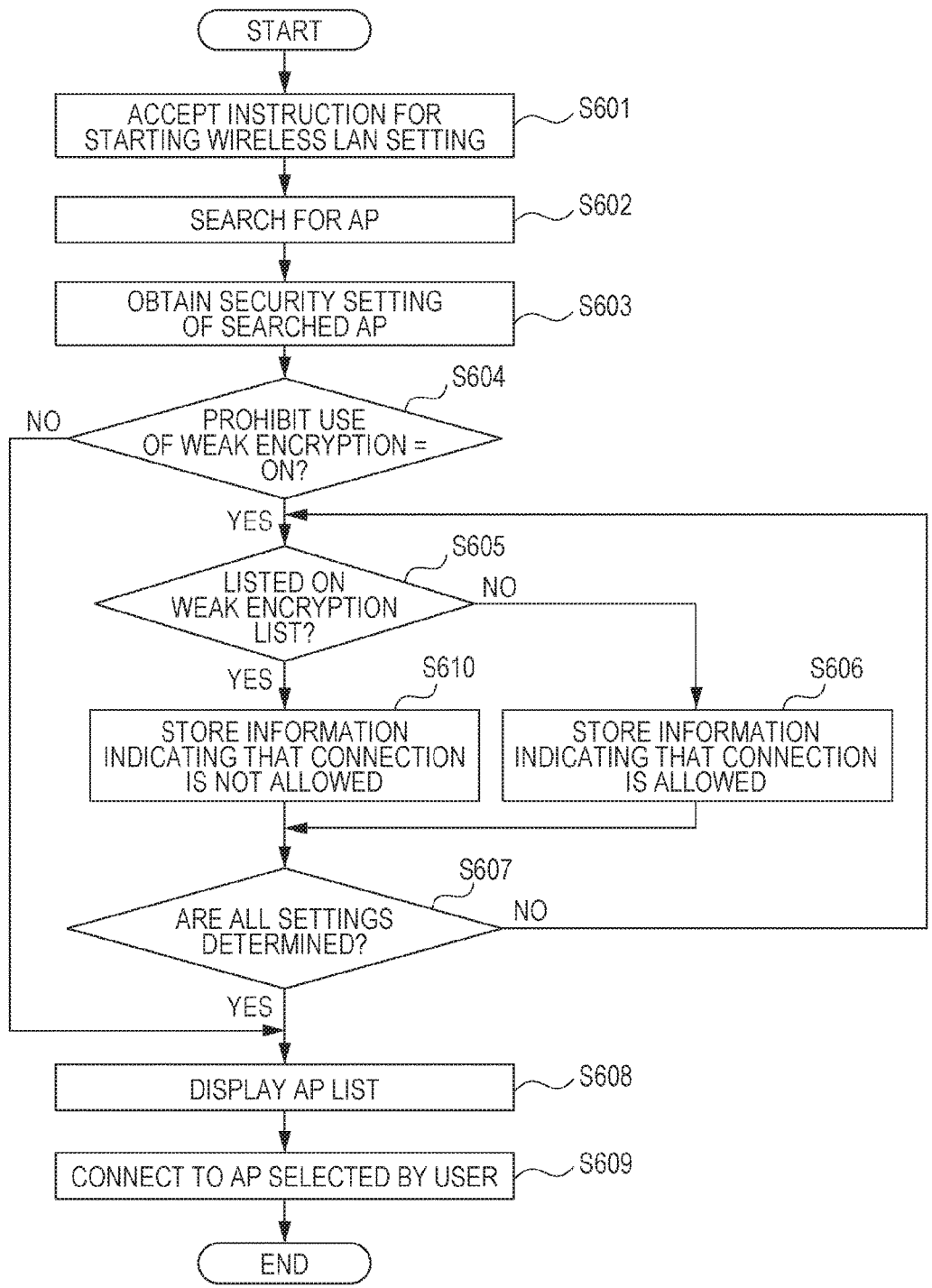

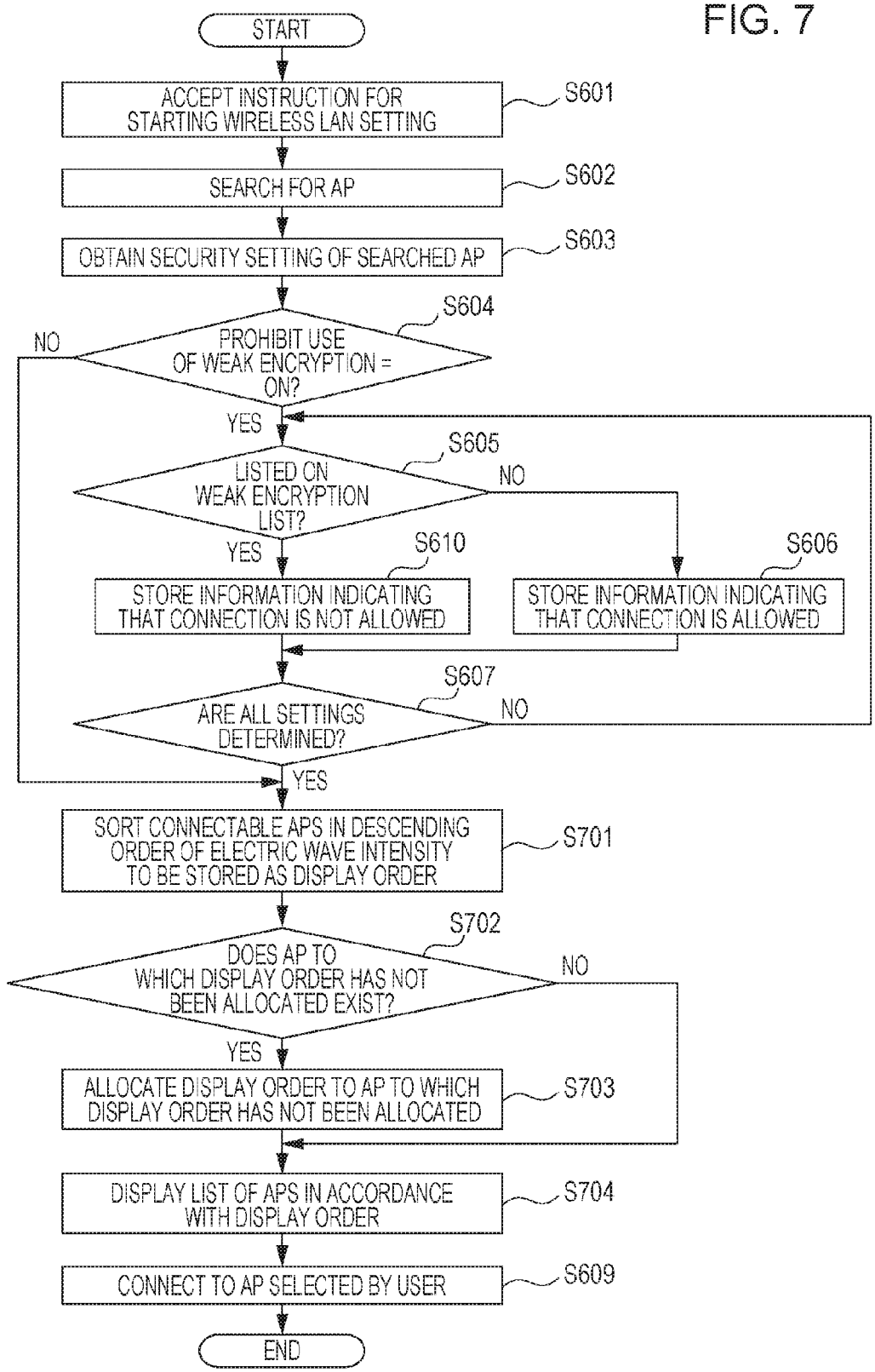

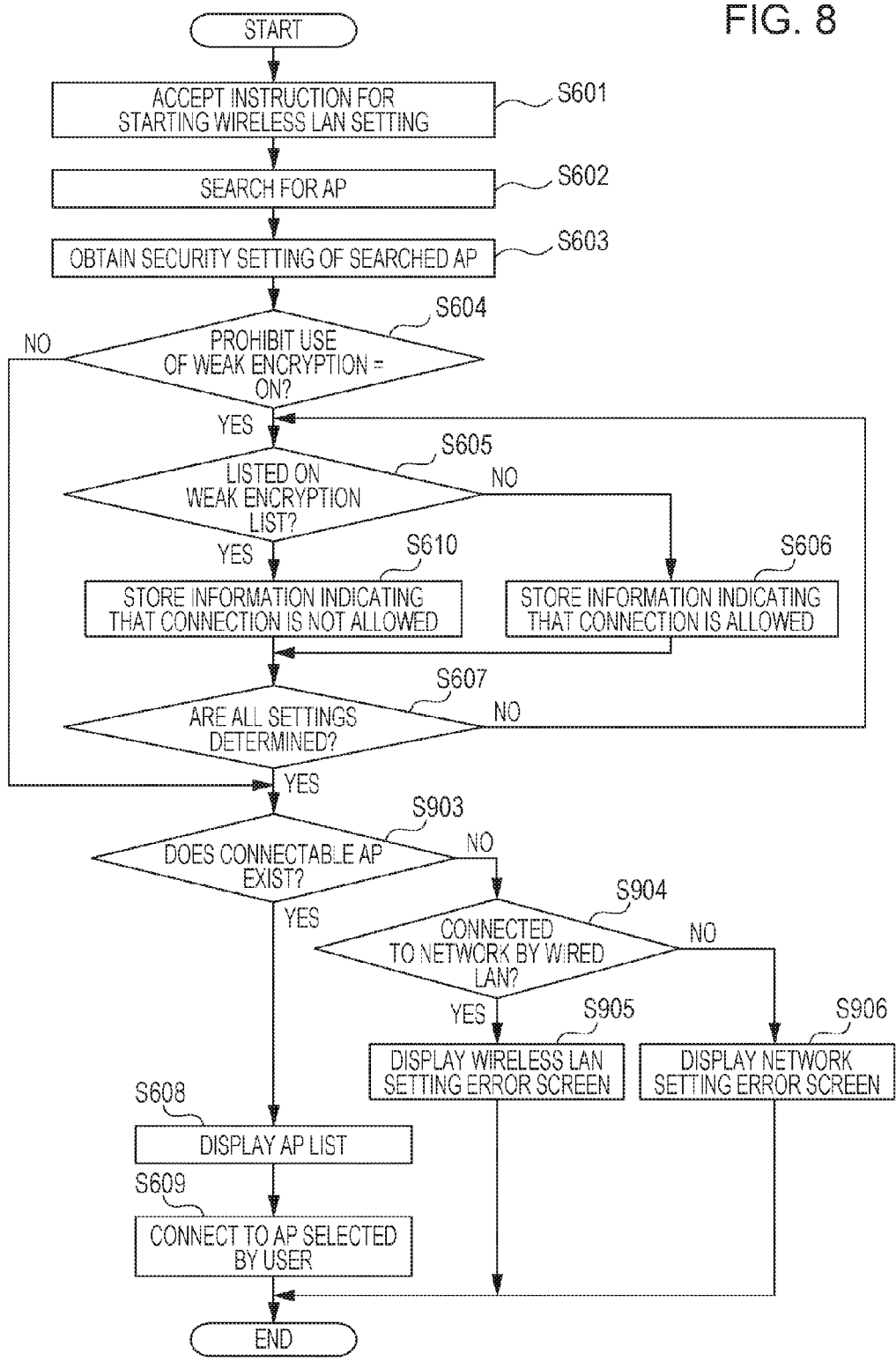

APPARATUS AND METHOD FOR RESTRICTING COMMUNICATION OF AN INFORMATION PROCESSING APPARATUS USING ENCRYPTION STRENGTH OF A RELAY

BACKGROUND

Field

Aspects of the present invention generally relate to an information processing apparatus that communicates with communication relay apparatuses such as access points (APs).

Description of the Related Art

An information device connected to an in-house network is preferably operated in accordance with a previously set information security policy. The information security policy is a basic principle concerning a cross-enterprise information security and is created by organizing a principle for using information and a principle for avoiding intrusion from an external part or information leakage. The information security policy is established by an administrator who deals with the security.

For example, one of security policies for enhancing the security is "prohibiting the use of a weak encryption". National Institute of Standards and Technology (NIST) issues SP800-57 as Special Publication (SP) series. To satisfy a standard of the security predefined in this SP800-57, according to the policy "prohibiting the use of a weak encryption", the use of a vulnerable encryption is prohibited. It should be noted that, according to the present specification, an encryption method of a communication shorter than or equal to a 1024-bit key length is simply described as a "weak encryption". With the application of this security policy, the use of a weak encryption is prohibited in internal processing of the information device.

In the information device, an encrypted communication is used in a wired communication or a wireless communication. Hereinafter, an example of the wireless communication will be described. As one of use methods of the encrypted communication in the wireless communication, a wireless local area network (LAN) is exemplified. With regard to the wireless LAN, a plurality of protocols exist which have different security strengths or different used encryptions which are predefined by Wi-Fi Alliance. A majority of information devices and the APs having a wireless LAN function support a plurality of protocols and appropriately use the protocol in accordance with a use purpose or a demanded security.

The protocols of the wireless LAN include Wired Equivalent Privacy (WEP), Wi-Fi Protected Access (WPA), and Wi-Fi Protected Access2 (WPA2). WPA and WPA2 can select an encryption method to be used. Temporal Key Integrity Protocol (TKIP) or Advanced Encryption Standard (AES) is used as the encryption method. For example, a method using AES in WPA2 is denoted by WPA2-AES or the like and is used as a security setting of the wireless LAN.

In a case where the wireless LAN is used by way of WEP from the information device, a WEP key previously set in the communication relay apparatus needs to be input. Normally, the above-described communication relay apparatus is referred to as an access point (hereinafter, will be referred to as an AP). It should be noted that the WEP key is an alphanumeric character string used as a key for the encryption of the communication. Similarly, in a case where the wireless LAN is used by way of WPA or WPA2 from the information device, a pre-shared key (PSK) previously set in the AP needs to be input. The PSK is an alphanumeric character string used as a key for the encryption of the communication.

Among those, only WPA-AES and WPA2-AES are settings in which the weak encryption is not used.

As an assisting unit for the setting of the wireless LAN connection, a setting unit of a wireless LAN based on an access point selection exemplified in FIGS. 10A and 10B has been proposed. In FIGS. 10A and 10B, electric wave intensities 101 of the APs are displayed by way of a plurality of bars having mutually different lengths on an AP selection screen 100. As the number of bars displayed on the electric wave intensity 101 is higher, the more stable communication can be performed. A service set identifier (SSID) 102 indicates an identification name of the AP. For example, in a case where a connection to an SSID "AP1" of the AP is attempted, the SSID 102 may be selected on the AP selection screen 100.

FIG. 10B illustrates an input screen 171 of the PSK. In a case where the encryption method of the communication in the security setting of the AP selected in FIG. 10A is WPA or WPA2, the input screen 171 is displayed. In FIG. 10B, a character string input on a PSK input column 172 is represented by * to avoid password leakage caused by peeking or the like. In a case where the PSK input at this time is matched with the PSK previously set in the AP selected on the AP selection screen 100, the wireless LAN communication is permitted.

In a wireless LAN communication in a network where the use of a weak encryption is prohibited as the security policy, when the communication is attempted by way of the security setting in which the weak encryption is used, an error occurs, and the communication is not permitted.

For this reason, if the user selects the AP using the weak encryption on the AP selection screen 100 of FIG. 10A, an communication error occurs, and an operation for selecting a connection destination again needs to be performed, which is troublesome. In addition, to select the AP that does not use the weak encryption, the user needs not only knowledge about the weak encryption but also knowledge about the encryption used in the wireless LAN. Therefore, it is difficult for a large number of users to select an appropriate AP in the first place.

SUMMARY

An information processing apparatus according to an aspect of the present invention includes a display unit configured to display a plurality of communication relay apparatuses so as to be selectable, an obtaining unit configured to obtain an encryption method of a communication supported by a communication relay apparatus, a method determination unit configured to determine whether the obtained encryption method of a communication relay apparatus has a predetermined encryption strength, and a control unit configured to control the display of the display unit based on a determination result of the method determination unit.

Further features of the present disclosure will become apparent from the following description of exemplary embodiments with reference to the attached drawings.

BRIEF DESCRIPTION OF THE DRAWINGS

FIG. 5 is a flow chart of processing for displaying a connection candidate AP.

FIG. 7 is a flow chart of the processing for displaying the connection candidate AP.

FIG. 8 is a flow chart of the processing for displaying the connection candidate AP.

DESCRIPTION OF THE EMBODIMENTS

Hereinafter, exemplary embodiments will be described with reference to the drawings.

First Exemplary Embodiment

Figure 1:
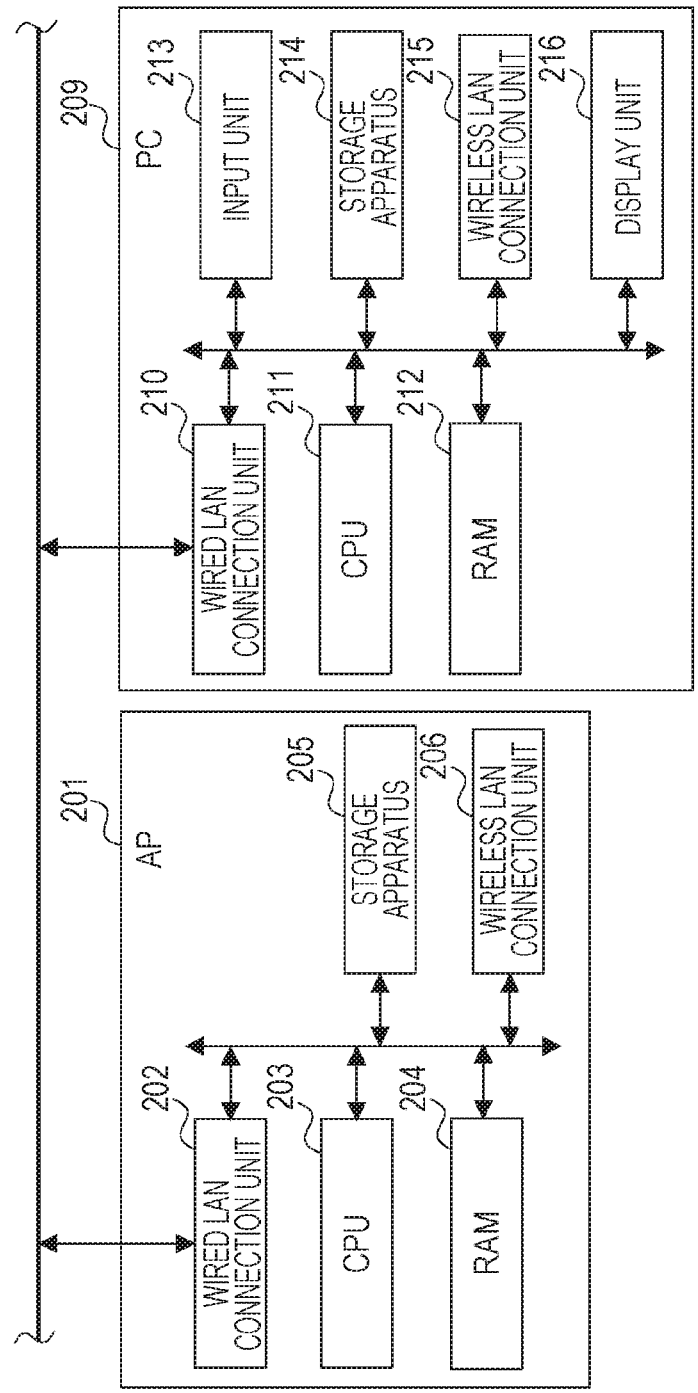
FIG. 1 is a block diagram illustrating a hardware configuration overview of an information processing apparatus and an AP.

FIG. 1 is a block diagram of an information processing apparatus that performs an encrypted wireless communication according to a first exemplary embodiment and a hardware configuration overview of an AP functioning as a communication relay apparatus. In FIG. 1, an AP 201 performs an encrypted wireless communication with a personal computer (PC) 209 functioning as the information processing apparatus that performs the encrypted wireless communication. It should be noted that, according to the present exemplary embodiment, descriptions will be given while it is assumed that five APs including the AP 201, an AP 220, an AP 230, an AP 240, and an AP 250 are prepared as a plurality of APs that can be connected to the PC 209 via a wireless communication. These APs are connected to one another via a wired network.

Since hardware configurations of the AP 201 and the other APs are identical to one another, only the AP 201 is illustrated in FIG. 1, and the other APs are omitted. Furthermore, according to the following exemplary embodiment, an encrypted wireless LAN is used as an example of the encrypted wireless communication using the AP, but aspects of the present invention are not limited to the encrypted wireless LAN and can be applied to an arbitrary encrypted wireless communication.

The PC 209 includes a wired LAN connection unit 210 configured to perform a communication with the other information devices in the network by way of the wired LAN, a CPU 211 configured to execute various controls, and a RAM 212 that temporarily stores information such as a program code executed by the CPU 211. The PC 209 further includes an input unit 213 configured to accept an input by an administrator to the PC 209 and a display unit 216 configured to display an execution result of the program code executed by the CPU 211 and the like.

It should be noted that an arbitrary input apparatus such as a keyboard, a mouse, or a touch panel can be used as the input unit 213. According to the following respective exemplary embodiments, descriptions will be given while it is assumed that a touch panel display is used as the input unit 213 and the display unit 216, and an item or a check box displayed on the touch panel display is touched by the user to perform the input. Furthermore, the PC 209 is provided with a storage apparatus 214 functioning as a storage unit configured to store the program code or data and a wireless LAN connection unit 215 configured to perform a communication by using the AP and the wireless LAN.

The AP 201 includes a wireless LAN connection unit 206 configured to perform a communication with the information device using the wireless LAN such as the PC 209 and a wired LAN connection unit 202 configured to perform a communication with the other devices on the network by using a communication content of the wireless LAN connection unit 206. In addition, the AP 201 is provided with a CPU 203 configured to execute various control programs, a RAM 204 that temporarily stores information such as the program code executed by the CPU 203, and a storage unit 205 that stores the program code or data.

Figure 2:
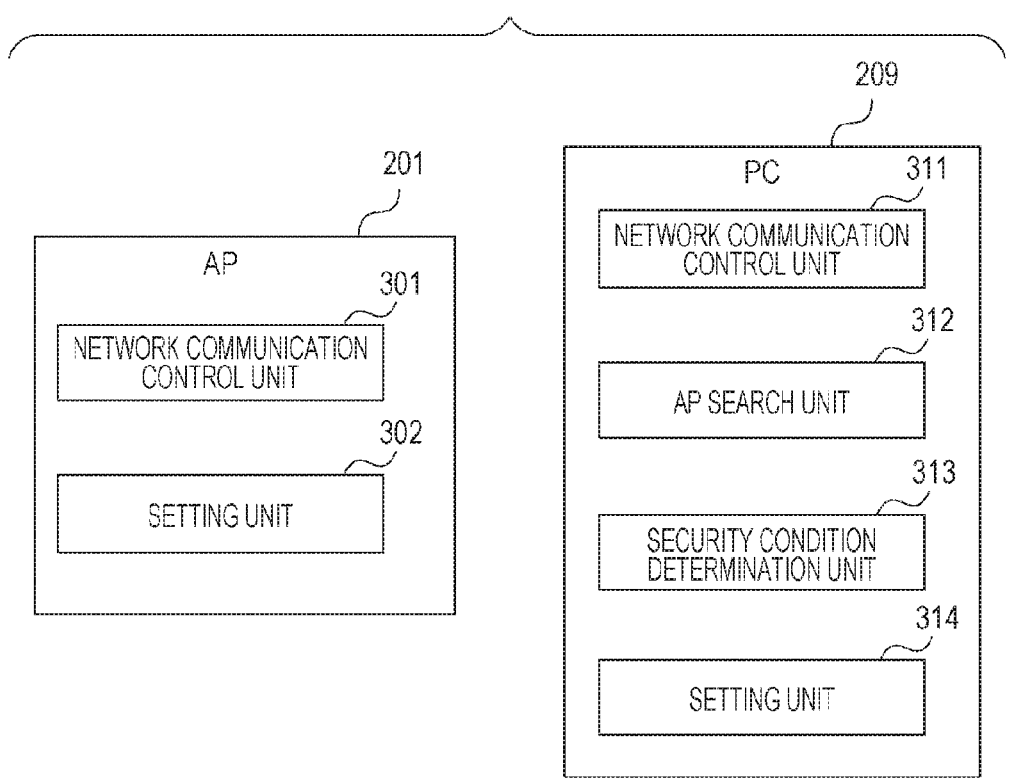
FIG. 2 is a functional block diagram of software.

FIG. 2 is a functional block diagram of software constituted in the AP 201 and the PC 209 respectively by the CPU 203 and the CPU 211 according to the present exemplary embodiment. The AP 201 operates as the communication relay apparatus according to the present exemplary embodiment. A network communication control unit 301 of the AP 201 performs a control on the wireless LAN connection and the communication from the other information devices to the wireless LAN connection unit 206. The network communication control unit 301 also performs a control at the time of the communication with the other information devices via the wired LAN connection unit 202 or the network. Therefore, in a case where the information device performs the wireless LAN connection with respect to the AP to establish the communication with the other information devices on the network, the network communication control unit 301 controls the wireless LAN connection unit 206 and the wired LAN connection unit 202 to carry out a communication relay.

A setting unit 302 of the AP 201 transmits a setting screen related to the wireless LAN communication of the AP 201 from the network to the other information devices and receives a content set by the user through the information device from the network to be stored in the storage unit 205. The AP 201 performs an operation in accordance with the setting stored in the setting unit 302.

Next, the PC 209 will be described. A network communication control unit 311 controls the communication to the network by the wired LAN connection unit 210 or the wireless LAN connection unit 215. An AP search unit 312 searches for the communicable AP via the wireless LAN connection unit 215. A security condition determination unit 313 determines whether or not an encryption method of the communication in the security setting of the AP satisfies a predetermined condition. According to the present exemplary embodiment, the security condition determination unit 313 determines whether or not the encryption method has a predetermined strength. A setting unit 314 stores an operation setting of the PC 209 or the setting related to the wireless LAN connection in the storage apparatus 214. It should be noted that, since the software configurations of the AP 201 and the other APs are identical to each other, illustrations of the AP 220, the AP 230, the AP 240, and the AP 250 to FIG. 2 and descriptions thereof will be omitted.

Figure 3:
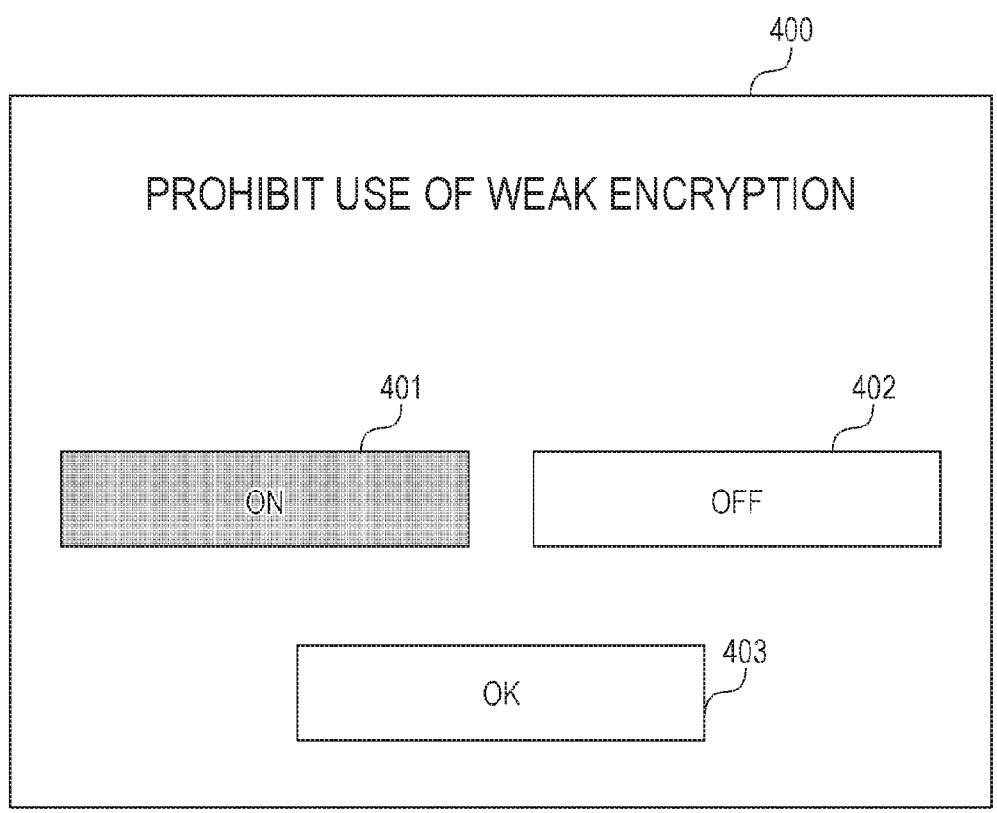
FIG. 3 is an explanatory diagram for describing an operation setting screen.

FIG. 3 illustrates an operation setting screen of the PC 209. In FIG. 3, a setting screen 400 is a screen for performing a setting of prohibiting the use of the encryption method that does not have the predetermined encryption strength, and an ON area 401, an OFF area 402, and a confirmation area 403 are provided on the setting screen 400. According to the present exemplary embodiment, a weak encryption is specified as the encryption method that does not have the predetermined encryption strength. In FIG. 3, the ON area 401 is displayed while being grayed out, which indicates that "prohibiting the use of a weak encryption" is valid. The user selects one of the ON area 401 and the OFF area 402 to be displayed while being grayed out, and thereafter, the user selects the confirmation area 403 to complete the setting.

Hereinafter, descriptions will be given while it is assumed that, in a case where this setting is turned ON, an encryption method listed on a weak encryption list stored in the storage apparatus 214 or a function using the weak encryption is not allowed to be used in the PC 209.

Table 1 represents the weak encryption list according to the present exemplary embodiment. The weak encryption list includes WEP, WPA-TKIP, and WPA2-TKIP. In a case where the ON area 401 is displayed while being grayed out on the setting screen 400 and "prohibiting the use of a weak encryption" is valid, "WEP", "WPA-TKIP", and "WPA2-TKIP" are not allowed to be used. It should be noted that this configuration is merely an example, and the other encryption methods or functions using the weak encryption may be listed.

TABLE 1

WEP
WPA-TKIP
WPA2-TKIP

Figure 4:
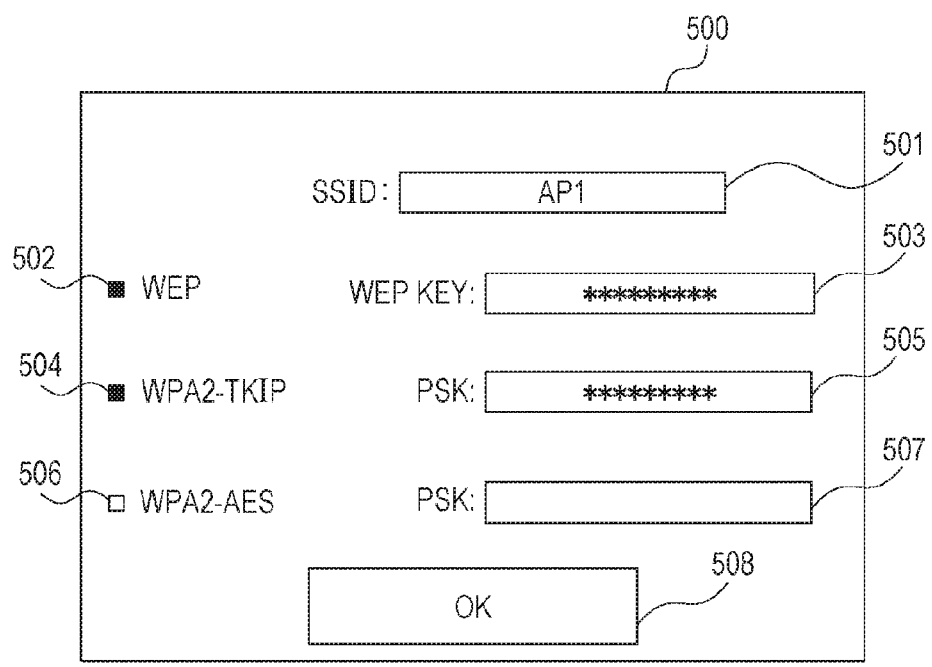
FIG. 4 is an explanatory diagram for describing a setting screen for performing a wireless LAN setting.

FIG. 4 illustrates a setting screen 500 for performing a wireless LAN setting displayed on the other information device by the setting unit 302.

In FIG. 4, an item 501 is used for setting an SSID for identifying the AP. According to the present exemplary embodiment, AP1 is set for the AP 201 as the SSID. A check box 502 displays whether or not the use of the WEP is permitted as the encryption method when the information device performs the communication to the AP. According to the present exemplary embodiment, the check box 502 is displayed in black, and it is indicated that the use of the WEP is permitted. An item 503 is used for setting the WEP key. In a case where the use of the WEP is permitted, the WEP key is input. As described above, to improve the security according to the present exemplary embodiment, the input character string is displayed as *.

Similarly, a check box 504 is displayed in black, and it is indicated that the use of WPA2-TKIP is permitted as the encryption method when the information device performs the communication to the AP. In addition, the PSK is set in an item 505.

On the other hand, a check box 506 is displayed while being outlined, and it is indicated that the use of WPA2-AES is not permitted as the encryption method when the information device performs the communication to the AP. Since the use of WPA2-AES is prohibited, a key is not input to an item 507. After the setting is ended, the user confirms the setting completion through a confirmation item 508.

Next, a method of displaying APs corresponding to appropriate connection candidates in accordance with the setting of the PC 209 according to an exemplary embodiment will be described with reference to a flow chart of FIG. 5. It should be noted that, according to the present exemplary embodiment, the CPU 211 reads out the program stored in the storage apparatus 214 of the AP 201 onto the RAM 212 to be executed, and accordingly, the processing described in the flow chart of FIG. 5 is executed. However, the program does not necessarily need to be stored in the storage apparatus 214, and the program stored in an arbitrary apparatus may be read out via a network or the like.

A wireless LAN setting instruction by the user is accepted via the input unit 213 (S601), the setting unit 314 issues a search instruction for the APs to the AP search unit 312 to perform the search for the AP (S602). When the search instruction is received from the setting unit 314, the AP search unit 312 issues the search instruction to the network communication control unit 311. When the search instruction is received, the network communication control unit 311 transmits search packets to the respective APs from the wireless LAN connection unit 215.

The AP 201 receives the search packet via the wireless LAN connection unit 206. Thereafter, the network communication control unit 301 of the AP 201 transmits a response packet to the PC 209 via the wireless LAN connection unit 206. This response packet includes the SSID of the AP 201 and the encryption method. It should be noted that, similarly, the AP 220, the AP 230, the AP 240, and the AP 250 also receive the search packets and transmit the response packets to the PC 209 via the respective wireless LAN connection units. Since the processing in the AP 220, the AP 230, the AP 240, and the AP 250 is similar to the processing in the AP 201, the processing in the AP 201 will be hereinafter described.

When the response packet is received via the wireless LAN connection unit 215, the network communication control unit 311 calculates the electric wave intensity to be stored in the RAM 212 while the response packet and the electric wave intensity are regarded as a set. Therefore, according to the present exemplary embodiment, the network communication control unit 311 of the AP functions as a unit configured to detect the electric wave intensity of the AP. When a predetermined time has elapsed since the transmission of the search packet, the network communication control unit 301 of the AP 201 notifies the AP search unit 312 of the PC 209 of the search end. When the search end notification is received, the AP search unit 312 analyzes the response packet stored in the RAM 212 and detects the SSID to be stored in the RAM 212 while the electric wave intensity and the SSID are regarded as a set. Table 2 illustrates the SSIDs, the electric wave intensities, and the encryption methods of the respective APs according to the present exemplary embodiment.

TABLE 2

| AP | SSID | ELECTRIC WAVE INTENSITY | SECURITY SETTING |
|---|---|---|---|
| AP 201 | AP1 | 4 | WEP, WPA2-TKIP |
| AP 220 | AP2 | 3 | WPA-AES |
| AP 230 | AP3 | 2 | WPA-TKIP |
| AP 240 | AP4 | 4 | WPA2-TKIP |
| AP 250 | AP5 | 4 | WPA2-AES |

As illustrated in Table 2, in a case where the AP search unit 312 analyzes the response packet of the AP 201, "AP1" and "4" are regarded as a set to be stored in the RAM 212.

After the SSID is stored in the RAM 212, the AP search unit 312 of the PC 209 notifies the setting unit 314 of the search end. When the search end notification is received, the setting unit 314 obtains the security setting via the AP search unit 312 from the response packet stored in the RAM 212 (S603). Accordingly, the setting unit 314 obtains the encryption method supported by the connectable AP. When an obtaining instruction of the encryption method is received from the setting unit 314, the AP search unit 312 analyzes the response packet stored in the RAM 212 and stores the connectable encryption method of each of the APs in the RAM 212 while the SSID, the electric wave intensity, and the connectable encryption method are regarded as a set (hereinafter, will be referred to as an AP setting set). Therefore, according to the present exemplary embodiment, the AP search unit 312 functions as a setting obtaining unit configured to obtain the encryption method that can be set in each of the APs.

As illustrated in Table 2, in a case where the response packet of the AP 201 is analyzed, the AP search unit 312 stores "AP1", "4", "WEP", and "WPA2-TKIP" in the RAM 212 as the AP setting set. When the analysis of all the response packets is completed, the AP search unit 312 notifies the setting unit 314 of the analysis completion. Table 3 illustrates the AP setting sets stored in the RAM 212 at the time of step S603.

TABLE 3

| SSID | ELECTRIC WAVE INTENSITY | SECURITY SETTING |
|------|-------------------------|------------------|
| AP1  | 4 | WEP, WPA2-TKIP |
| AP2  | 3 | WPA-AES |
| AP3  | 2 | WPA-TKIP |
| AP4  | 4 | WPA2-TKIP |
| AP5  | 4 | WPA2-AES |

When the analysis completion notification is received from the AP search unit 312, the security condition determination unit 313 obtains the setting "prohibiting the use of a weak encryption" is valid which is stored in the RAM 212. Thereafter, the security condition determination unit 313 determines whether or not the setting of prohibiting the use of the encryption in the setting screen 400 is ON (S604).

When it is determined that the setting "prohibiting the use of a weak encryption" is ON (S604: YES), the setting unit 314 determines whether or not the encryption method of the AP setting set is listed on the weak encryption list (S605).

In a case where the encryption method is not listed on the weak encryption list, the setting unit 314 stores information indicating that the connection is allowed with regard to the AP 201 in the RAM 212 (S606). On the other hand, in a case where the encryption method is listed on the weak encryption list (S605: YES), the setting unit 314 stores information indicating that the connection is not allowed with regard to the AP 201 in the RAM 212 (S610). Therefore, according to the present exemplary embodiment, the security condition determination unit 313 functions as an encryption method determination unit configured to determine whether or not the encryption method obtained from the AP has a predetermined encryption strength. The encryption list according to the present exemplary embodiment has a format of a table in which the encryption method that does not have the predetermined encryption strength is registered. It should be noted that, in a case where a table in which the encryption method having the predetermined encryption strength is registered is used and the encryption method of the AP setting set is not listed on this registered encryption method, the AP can be set as not connectable.

As illustrated in Table 2, the AP setting set generated from the response packet of the AP 201 includes WEP. Therefore, the determination result in step S605 with respect to the AP 201 is YES. Thus, with respect to the AP setting set of the AP 201 corresponding to the determination target in step S605, the setting unit 314 stores the information indicating "not connectable" as connectability information as the set in the RAM 212.

On the other hand, the AP setting set generated from the response packet of the AP 220 includes only WPA-AES, and the encryption method does not include the weak encryption. Therefore, in a case where the AP setting set of the AP 220 is set as a determination target in step S605, with respect to the AP setting set of the AP 220, the setting unit 314 stores the information indicating "not connectable" as the connectability information as the set in the RAM 212.

After the processing in step S606 or step S610 is executed, the setting unit 314 determines whether or not the determination processing of the encryption method in step S605 is performed on all the AP setting sets (S607). In a case where the determination on all the AP setting sets is not completed (S607: NO), the setting unit 314 returns to step S650 and performs the determination on the AP setting set where the determination has not yet been performed. On the other hand, in a case where the determination on all the AP setting sets is completed (S607: YES), the setting unit 314 displays the AP list on the display unit 216 (S608).

Table 4 illustrates the sets of the AP setting sets and the connectability information stored in the RAM 212 at a time when the setting unit 314 executes step S608.

TABLE 4

| SSID | ELECTRIC WAVE INTENSITY | SECURITY SETTING | CONNECTABILITY INFORMATION |
|------|-------------------------|------------------|----------------------------|
| AP1  | 4 | WEP | NOT CONNECTABLE |
| AP2  | 3 | WPA-AES | CONNECTABLE |
| AP3  | 2 | WPA-TKIP | NOT CONNECTABLE |
| AP4  | 4 | WPA2-TKIP | NOT CONNECTABLE |
| AP5  | 4 | WPA2-AES | CONNECTABLE |

In step S608, the setting unit 314 displays the APs in a predetermined order based on the AP setting sets and the connectability information illustrated in Table 4 stored in the RAM 212. According to the present exemplary embodiment, the AP that performs the wireless communication by way of the encryption method having the predetermined encryption strength is displayed on the display unit 216 more preferentially than the other AP. On the other hand, the AP that performs the wireless communication by way of the encryption method that does not have the predetermined encryption strength is displayed following after the AP that performs the wireless communication by way of the encryption method having the predetermined encryption strength. According to the present exemplary embodiment, the APs having a higher priority are displayed on the display screen in order from the upper part of the screen. The number of APs that can be displayed on the screen is 5. In a case where APs having the sixth and subsequent priorities exist, these APs are not displayed on the screen.

In addition, according to the present exemplary embodiment, the AP list is displayed on the display unit 216, and also a display format of the AP in which the connectability information indicates "not connectable" is set to be different from a display format of the AP in which the connectability information indicates "connectable". For this reason, according to the present exemplary embodiment, the AP in which the connectability information indicates "not connectable" is displayed while being grayed out. Therefore, the normally displayed AP in which the connectability information indicates "connectable" is visually distinct and is thus preferentially displayed. On the other hand, while the AP in which the connectability information indicates "not connectable" is displayed while being grayed out and is not visually distinct, the priority in display is lowered. It should be noted that a configuration may be supported in which, to lower the priority in display, the AP in which the connectability information indicates "not connectable" is not displayed. Furthermore, according to the present exemplary embodiment, in a case where the input of selecting the AP in which the connectability information indicates "not connectable" is performed, the CPU 211 does not accept this input. Therefore, the user is not allowed to select the AP displayed while being grayed out.

Figure 6A:
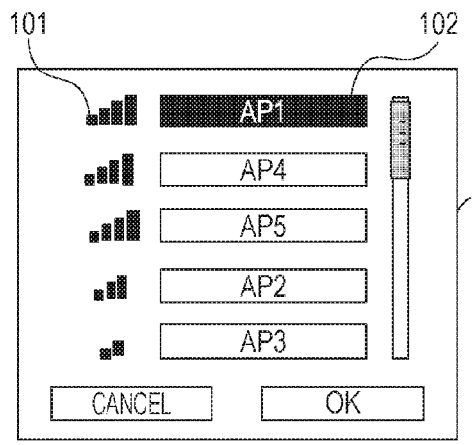
FIGS. 6A to 6H are explanatory diagrams for describing a selection screen by way of AP list display.

FIGS. 6A to 6H illustrate examples of a selection screen based on the AP list display. FIG. 6A illustrates a case where the connectability information of all the APs indicates "connectable". In FIG. 6A, none of AP display items (SSIDs) 102 are displayed while being grayed out, and the connectability information of the respective AP1 to AP5 indicates "connectable". It should be noted that the user selects AP1 in FIG. 6A, and as a result, the AP display item 102 of AP1 is reversely displayed. Normally, the user preferentially selects the AP having the high electric wave intensity. Therefore, in FIG. 6A, the electric wave intensity is used as a reference of the priority, and the APs are sorted on the screen of the display unit 216 such that the APs having the higher electric wave intensity are displayed on the upper part of the screen. It should be noted that the priority on the screen can be arbitrarily set. For example, the APs having the higher priority may be displayed from the left side of the screen. The APs having the higher priority may also be displayed in an increased size.

In a case where the setting "prohibiting the use of a weak encryption" is OFF on the setting screen 400, the determination result in step S604 is NO in FIG. 5, and the step of storing the information indicating that the connection is not allowed in the RAM 212 is not executed (S610). Therefore, since the RAM 212 does not store the connectability information, the AP list is displayed as FIG. 6A.

Figure 6B:
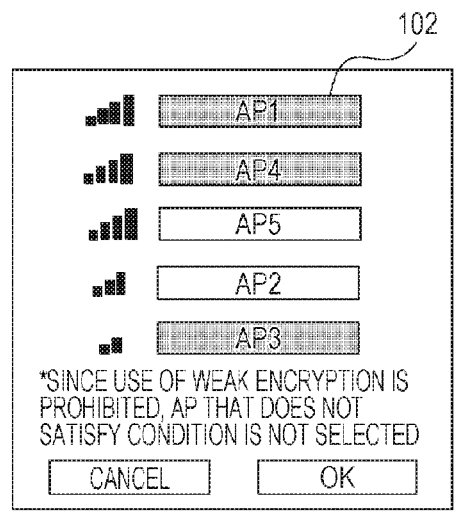

On the other hand, according to the present exemplary embodiment, as illustrated in Table 4, AP1, AP3, and AP4 are set as "not connectable". Therefore, as illustrated in FIG. 6B, the display item 102 of AP1 is displayed while being grayed out in the AP list display, and it is indicated that the wireless LAN connection to the AP 201 having the SSID of AP1 is not allowed. Similarly, AP4 and AP3 are also displayed while being grayed out, and it is indicated that the wireless LAN connection to these APs is not allowed. None of AP5 and AP2 are displayed while being grayed out, and it is indicated that the wireless LAN connection to these APs is allowed.

Figure 6C:
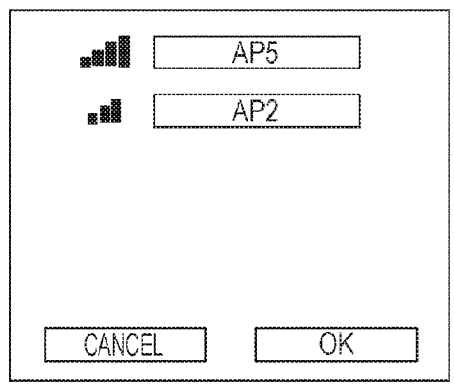
Figure 6D:

It should be noted that the APs that are not selectable are displayed while being grayed out in the list in the example of FIG. 6B, but as illustrated in FIG. 6C, a configuration may be supported in which the display of the APs that are not selectable is not performed. In addition, instead of the grayout or nondisplay, an error message as illustrated in FIG. 6D may be displayed in a case where the AP corresponding to the setting "not connectable" is selected.

When the AP at the connection destination is selected by the user from the AP list via the input unit 213, the PC 209 urges the user to input a setting for performing the wireless LAN communication via the display unit 216. For example, in a case where the wireless LAN connection is performed with the AP by way of WPA2-AES, the user is urged to input the PSK. When the input completion is accepted from the user through the input unit 213, the setting unit 314 instructs the network communication control unit 311 to establish the connection to the selected AP (S609), and the processing is ended. The network communication control unit 311 transmits the connection instruction to the wireless LAN connection unit 215 to start the wireless LAN connection processing.

According to the present exemplary embodiment, the AP using the weak encryption is set as not selectable on the screen display of the wireless LAN connection setting. Therefore, it is possible to avoid redoing the setting while the user erroneously selects the AP using the weak encryption to cause the communication error, and usability can be improved.

Second Exemplary Embodiment

Next, a second exemplary embodiment will be described.

Normally, access points are sorted in order of the electric wave intensity to be displayed on the access point selection screen of the wireless LAN. This is because, since the communication is not stabilized and the usability is degraded when the electric wave intensity is low, almost all users select the AP having the high electric wave intensity.

According to the first exemplary embodiment, the setting "prohibiting the use of a weak encryption" is ON, and the list of the APs is sorted in terms of the electric wave intensity to be displayed. In this case, depending on a setting state of the AP, the AP that is not connectable may be preferentially displayed, and the connectable AP may not be selected instantly.

Table 5 illustrates an example of the AP setting sets and the connectability information saved in the RAM 212 which are different from the first exemplary embodiment.

TABLE 5

| SSID | ELECTRIC WAVE INTENSITY | SECURITY SETTING | CONNECTABILITY INFORMATION |
| --- | --- | --- | --- |
| AP1 | 3 | WEP | NOT CONNECTABLE |
| AP2 | 4 | WPA-TKIP | NOT CONNECTABLE |
| AP3 | 4 | WPA-TKIP | NOT CONNECTABLE |
| AP4 | 4 | WPA2-TKIP | NOT CONNECTABLE |
| AP5 | 4 | WPA2-TKIP | NOT CONNECTABLE |
| AP6 | 2 | WPA2-AES | CONNECTABLE |
| AP7 | 3 | WPA-AES | CONNECTABLE |

Figure 6E:
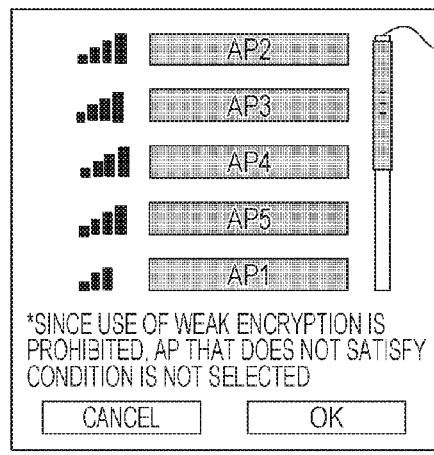
Figure 6F:
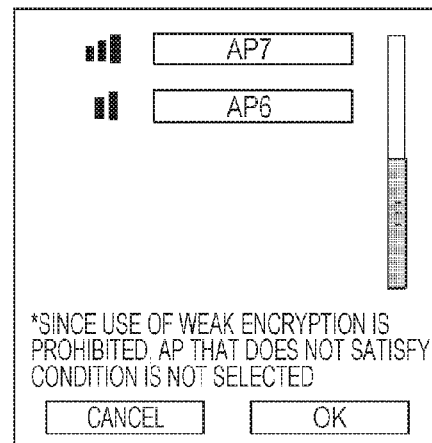

FIGS. 6E and 6F illustrate the display screens of the AP list in which the AP setting sets illustrated in Table 5 are sorted in terms of the electric wave intensity to be displayed similarly as in the first exemplary embodiment. It should be noted that the AP setting sets include seven APs in this example, and on the other hand, the maximum number of APs that can be displayed on the screen is 5. Therefore, in FIGS. 6E and 6F, the APs that are not displayed on the screen are displayed while the screen is scrolled by using a scroll bar 151.

In a case where the user attempts to establish the wireless LAN connection, an AP selection screen is displayed on the display unit 216 of the PC 209 as illustrated in FIG. 6E. All of the APs displayed on the screen have the strong electric wave intensity but connections are not allowed since the use of a weak encryption is prohibited. While the user operates the scroll bar 151 through the input unit 213, as illustrated in FIG. 6F, the hidden AP6 and AP7 are displayed on the screen.

In this manner, in a case where the connectable AP is not displayed on the screen or a case where the AP having the strongest electric wave intensity among the connectable APs is selected, the user needs to operate the scroll bar 151 to display the screen of FIG. 6F. Thus, in the above-described situation, sufficient usability may not be provided to the user in some cases.

Therefore, according to the second exemplary embodiment, an example will be described in which, when the processing in step S607 of FIG. 5 is ended, the RAM 212 stores the AP setting sets illustrated in Table 5.

FIG. 7 illustrates a flow chart for describing processing of the setting unit 314 according to the present exemplary embodiment. In FIG. 7, the processing in steps S601 to S607 and steps S609 and S610 is similar to the processing in FIG. 5 according to the first exemplary embodiment, and the descriptions thereof will be omitted.

After the determination result in step S604 of FIG. 7 is NO or the processing in step S607 is executed, the setting unit 314 selects sets of the setting lists in which the connectability information indicates "connectable" and the connectability information. Thereafter, the setting unit 314 sorts the selected sets in order of the electric wave intensity and stores the result in the RAM 212 (S701). In the example of Table 5, the setting unit 314 selects AP6 and AP7, and the display order is allocated first to AP6 having the highest electric wave intensity among the APs.

Table 6 illustrates the AP setting list stored in the RAM 212, the connectability information, and the display order when the processing in step S701 is ended.

TABLE 6

| SSID | ELECTRIC WAVE INTENSITY | SECURITY SETTING | CONNECTABILITY INFORMATION | DISPLAY ORDER |
|---|---|---|---|---|
| AP1 | 3 | WEP | NOT CONNECTABLE | |
| AP2 | 4 | WPA-TKIP | NOT CONNECTABLE | |
| AP3 | 4 | WPA-TKIP | NOT CONNECTABLE | |
| AP4 | 4 | WPA2-TKIP | NOT CONNECTABLE | |
| AP5 | 4 | WPA2-TKIP | NOT CONNECTABLE | |
| AP6 | 2 | WPA2-AES | CONNECTABLE | 2 |
| AP7 | 3 | WPA-AES | CONNECTABLE | 1 |

In FIG. 7, in a case where the determination result in step S604 is NO and the processing of the setting unit 314 proceeds to S701, the storage of the connectability information to the RAM 212 in step S606 and step S610 is not performed, and only the setting list is stored in the RAM 212. In this case, the processing in S701 and subsequent steps is performed while the setting unit 314 regards that all of the APs are "connectable".

Next, the setting unit 314 determines whether or not the AP in which the connectability information indicates "not connectable" and to which the display order is not allocated exists (S702).

When it is determined that the AP to which the display order is not allocated exists (S702: YES), the setting unit 314 allocates the display order in order of the electric wave intensity following the display order allocated in step S701 to the relevant set (S703). It should be noted that the display order is already allocated to the "connectable" AP in order of the electric wave intensity, but the display order to the APs that are "not connectable" in step S703 is not limited to the order of the electric wave intensity of the APs, and the display order may be allocated on the basis of the other arbitrary reference.

Table 7 illustrates the setting list, the connectability information, the display priority, and the display order stored in the RAM 212 when the display order is allocated in step S703 in order of the electric wave intensity and the processing is ended.

TABLE 7

| SSID | ELECTRIC WAVE INTENSITY | SECURITY SETTING | CONNECTABILITY INFORMATION | DISPLAY PRIORITY | DISPLAY ORDER |
|---|---|---|---|---|---|
| AP1 | 3 | WEP | NOT CONNECTABLE | LOW | 7 |
| AP2 | 4 | WPA-TKIP | NOT CONNECTABLE | LOW | 3 |
| AP3 | 4 | WPA-TKIP | NOT CONNECTABLE | LOW | 4 |
| AP4 | 4 | WPA2-TKIP | NOT CONNECTABLE | LOW | 5 |
| AP5 | 4 | WPA2-TKIP | NOT CONNECTABLE | LOW | 6 |
| AP6 | 2 | WPA2-AES | CONNECTABLE | HIGH | 2 |
| AP7 | 3 | WPA-AES | CONNECTABLE | HIGH | 1 |

Next, the setting unit 314 displays the AP list in accordance with the display order and the connectability information stored in the RAM 212 (S704).

Figure 6G:
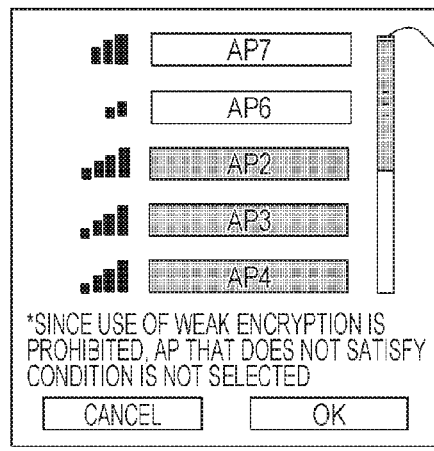
Figure 6H:
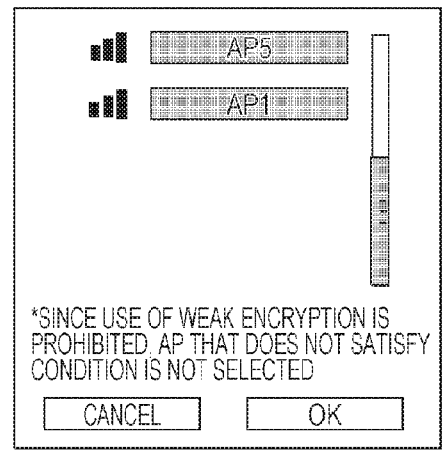

FIGS. 6G and 6H illustrate examples of the display screen displayed as the access point list according to the present exemplary embodiment. As illustrated in FIGS. 6G and 6H, AP7 and AP6 functioning as the connectable APs are displayed from the upper part of the screen. At this time, AP7 having the strong electric wave intensity is displayed on the top of the screen, and then, AP6 is displayed below AP7. Therefore, the scroll bar 151 does not need to be used to display AP7 and AP6. The other APs that are not connectable are displayed in order of the stronger electric wave intensity.

According to the present exemplary embodiment, by displaying not only the electric wave intensity but also the connectability information of the APs in the access point list as the determination reference for the display order, the connectable APs are preferentially displayed on the screen. Therefore, the usability for the user can be improved.

In addition, according to the present exemplary embodiment, the descriptions have been given while only the electric wave intensity is used as the reference for the sorting in step S701, but the encryption strength of the encryption method may be added to the determination reference for the display order. In this case, the storage apparatus 214 previously holds a priority rank list in which the encryption strength of the encryption method is set as the reference. The setting unit 314 sorts the encryption methods in Table 7 in accordance with the priority rank list and determines the display order in terms of the priority order of the encryption methods. Therefore, in this example, the setting unit 314 operates as a strength determination unit configured to determine a strength of the encryption method. Thereafter, the setting unit 314 performs sorting again in order of the electric wave intensity among the APs using the identical encryption method and determines the display order. In addition, the determination reference for the encryption strength may be arbitrarily set. For example, a key length in the encryption method may be used as the reference, and it may be determined that the intensity of the encryption method is stronger as the key length is longer.

The wireless LAN connection may be preferably established by way of the strong encryption method as much as possible depending on a use environment. According to the above-described technique, it is possible to urge the user to establish the wireless LAN connection where the still higher security is provided.

Third Exemplary Embodiment

According to the first and second exemplary embodiments, the descriptions have been given while the connectability information indicates that at least one of the APs is connectable, but depending on setting contents of the APs, no connection to any of the APs may be established in some cases. Even when a list window in a state in which the selection of the AP is not allowed is displayed on the display unit 216 in the above-described case, the user is not allowed to establish the wireless LAN connection, and a solution for setting the wireless LAN is not presented to the user.

According to a third exemplary embodiment, an example will be described in which information suggesting an operation procedure or an action used to establish a communication between the PC 209 and the AP 201 to the user is displayed on the screen in a case where the connectable AP does not exist as described above.

FIG. 8 is a flow chart for describing processing of the setting unit 314 according to the present exemplary embodiment. In FIG. 8, the processing in steps S601 to S607 and steps S609 and S610 is similar to the processing in FIG. 5 according to the first exemplary embodiment, and the descriptions thereof will be omitted.

After the determination result in step S604 of FIG. 7 is NO or the processing in step S607 is executed, the setting unit 314 determines whether or not the connectable AP exists with regard to the connectability information stored in the RAM 212 (S903). In a case where at least one "connectable" AP exists (S903: YES), the setting unit 314 displays the AP list (S608). The display order at this time can be arbitrarily determined. For example, steps S701 to S704 of FIG. 7 may be executed. In a case where the connectability information is not stored in the RAM 212, since this situation means that the use of a weak encryption is not prohibited in step S604, the processing of the setting unit 314 proceeds to step S608 in this case too. Thereafter, the setting unit 314 establishes the wireless communication with the AP selected by the user (S609), and the processing is ended.

On the other hand, in a case where the connectability information stored in the RAM 212 all indicates "not connectable" (S903: NO), the setting unit 314 enquires the network communication control unit 311 if the wired LAN is connectable. Thereafter, the setting unit 314 determines whether or not the connection to the network is established by way of the wired LAN (S904). In a case where the wired LAN is connectable (S904: YES), the setting unit 314 displays a wireless LAN setting error screen including information that indicates the operation procedure used to establish the communication with the AP on the display unit 216 to the user (S905). The information that indicates the operation procedure includes descriptions on a reason why the wireless LAN setting is not allowed, processing used to set the wireless LAN, the wired LAN setting information instead of the wireless LAN, or the like. Hereinafter, a detail thereof will be illustrated.

Figure 9A:
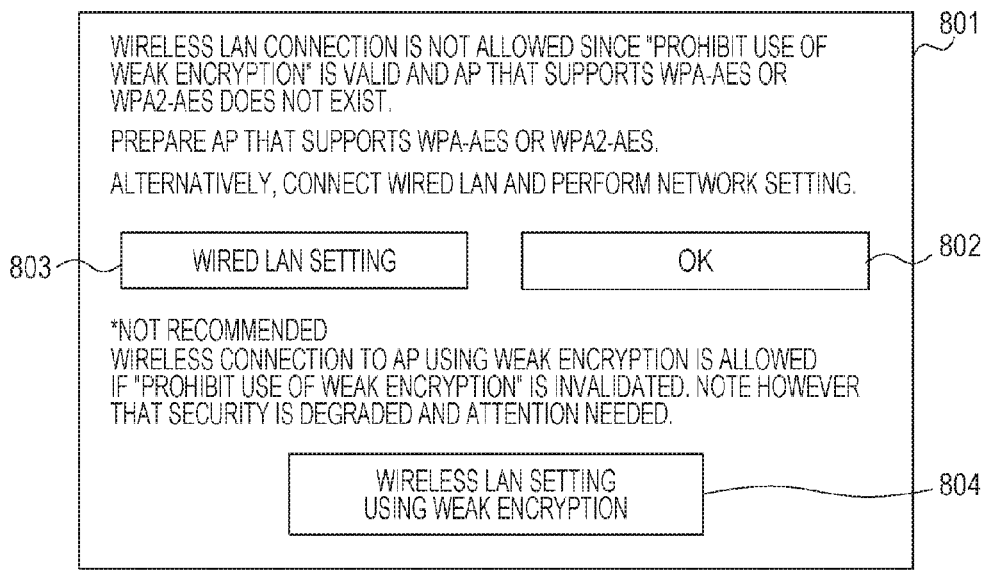
FIGS. 9A and 9B are explanatory diagrams for describing a wireless LAN setting error screen.

FIG. 9A illustrates a wireless LAN setting error screen 801 displayed on the display unit 216 in step S905. The wireless LAN setting error screen 801 is provided with a confirmation area 802 for accepting the instruction that the wireless LAN is not used from the user and an area 803 for accepting the instruction of the wired LAN setting from the user.

The wireless LAN setting error screen 801 displays descriptions indicating that the wireless LAN connection is not allowed because the use of a weak encryption is prohibited. In addition, the wireless LAN setting error screen 801 displays descriptions indicating that the wired LAN should be connected or the AP supporting WPA-AES or WPA2-AES having the high encryption strength should be prepared.

In a case where the wired LAN connection is established, the user instructs the setting unit 314 to perform the wired LAN setting through the area 803 on the wireless LAN setting error screen 801. In this case, the setting unit 314 ends the wireless LAN setting processing and displays the screen for performing the wired LAN setting to carry out the setting processing of the wired LAN.

In a case where neither the wired LAN connection or the wireless LAN connection is performed, the user performs the input through the confirmation area 802. In this case, the setting unit 314 ends the wireless LAN setting without performing the setting processing of the wired LAN.

It should be noted that, although a security level is degraded, the wireless LAN connection using the weak encryption may be needed in case of an emergency or the like. Therefore, as illustrated in the wireless LAN setting error screen 801 of FIG. 9A, an area 804 for accepting the instruction to perform the wireless LAN setting using the weak encryption may also be provided. In addition, the wireless LAN setting error screen 801 displays descriptions indicating that the wireless LAN setting using the weak encryption has a low security level and is not recommended. In a case where the wireless connection using the weak encryption is performed, the user performs the input through the area 804. In this case, the setting unit 314 turns off the setting "the use of a weak encryption is prohibited" of the storage apparatus 214 and executes the processing in step S601 and subsequent steps of FIG. 5.

On the other hand, in step S904, in a case where the connection of the wired LAN is not allowed (S904: NO), the setting unit 314 displays a network setting error screen displaying a message that urges the user to perform the action used to establish the network connection on the display unit 216 (S906).

Figure 9B:
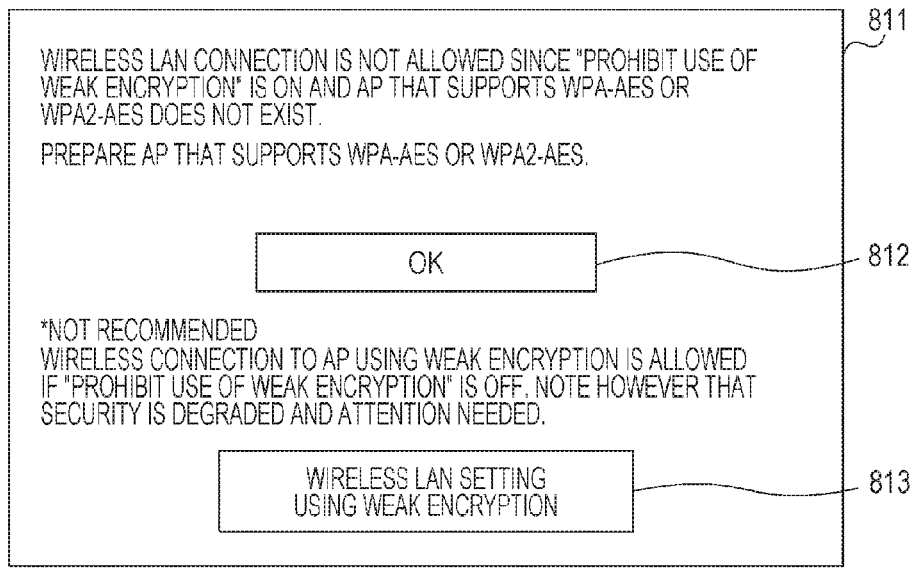
Figure 10A:
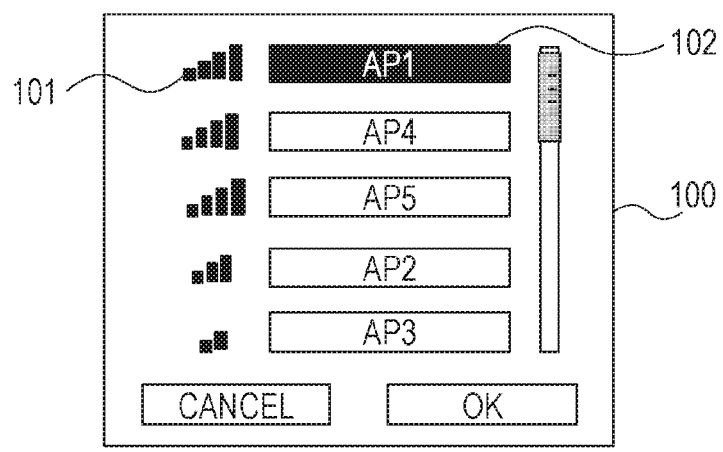
FIGS. 10A and 10B are explanatory diagrams for describing a selection screen by way of AP list display.
Figure 10B:
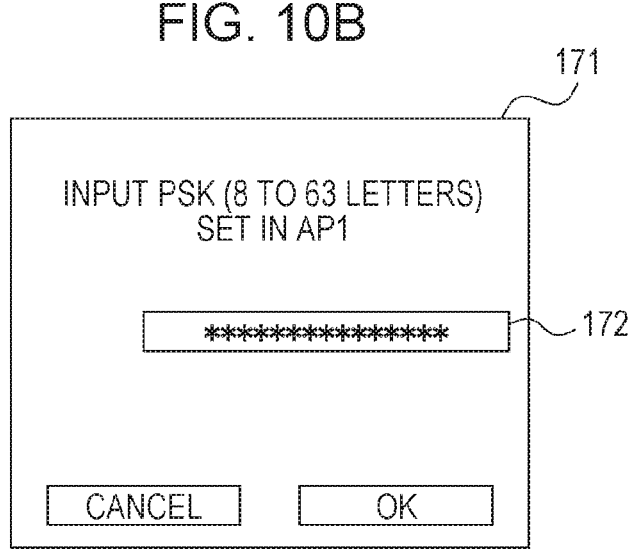

FIG. 9B illustrates a network setting error screen 811 displayed on the display unit 216 in step S906. The network setting error screen 811 is provided with a confirmation area 812 for accepting the instruction that the wireless LAN is not used from the user. It should be noted that, since the connection of the wired LAN is not allowed as described above, the area for accepting the instruction of the wired LAN setting is not provided. In addition, the area for the wired LAN setting and the descriptions with regard to the wired LAN are not provided on the network setting error screen 811.

In the example of FIG. 9B, since the use of a weak encryption is prohibited, the network setting error screen 811 displays the descriptions indicating that the wireless LAN connection is not allowed. The network setting error screen 811 also displays the descriptions indicating that the AP that supports WPA-AES or WPA2-AES having the high encryption strength should be prepared.

The user inputs the instruction that the wireless LAN is not used through the confirmation area 812 on the network setting error screen 811. In this case, the setting unit 314 ends the wireless LAN setting processing.

It should be noted that, similarly as in the example of FIG. 9A, although the security level is degraded, the wireless LAN connection using the weak encryption may be needed in case of an emergency or the like. Therefore, as represented by the network setting error screen 811 of the LAN in FIG. 9B, an area 813 for accepting the instruction to perform the wireless LAN setting using the weak encryption may be provided. In addition, the wireless LAN setting error screen 801 displays the descriptions indicating that the wireless LAN setting using the weak encryption has a low security level and is not recommended. In a case where the wireless connection using the weak encryption is established, the user performs the input through the area 813. In this case, the setting unit 314 turns off the setting "the use of a weak encryption is prohibited" of the storage apparatus 214 and executes the processing in step S601 and subsequent steps of FIG. 5.

As described above, according to the present exemplary embodiment, since a solution that may be selected by the user to establish the network connection is displayed on the screen in a case where the wireless LAN setting is not allowed, the network setting is facilitated for the user, and the usability is improved.

In addition, according to the third exemplary embodiment, the descriptions have been given while the PC 209 that can establish the wired LAN connection is used as the information processing apparatus. However, the information processing apparatus that does not establish the wired LAN connection can be used instead of the PC 209. In this case, when it is determined that the connectable AP does not exist in step S903 of FIG. 8 (S903: NO), the processing in step S905 may be performed without performing the processing in step S904.

In addition, the error screens illustrated in FIGS. 9A and 9B are merely examples, and a screen of the other content for assisting the user to establish the network connection may be used.

According to the above-described respective exemplary embodiments, the encryption strengths of the encryption methods of the respective APs are determined, and the APs that perform the communication by way of the encryption method having the predetermined encryption strength are preferentially displayed on the AP selection screen. Therefore, the user can easily select the appropriate AP to perform the communication.

In addition, the encryption strengths of the encryption methods of the respective APs are determined in the information processing apparatus. Therefore, even in a case where the number of APs corresponding to the connection candidates is increased, an updating operation of a white list or a black list does not need to be performed. For this reason, the decrease in the usability or the security level caused by the updating operation does not occur, and it is possible to display the appropriate AP selection screen.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-005333, filed Jan. 14, 2015, which is hereby incorporated by reference herein in its entirety.

What is claimed is:

1. An information processing apparatus comprising:
one or more processors; and
a memory storing instructions that, when executed, cause the one or more processors to operate as:
a setting unit configured to perform a setting that prohibits use of an encryption method for communication that does not have a predetermined encryption strength such that the setting is active or inactive;
a display unit configured to display a plurality of communication relay apparatuses;
an obtaining unit configured to obtain information regarding an encryption strength of an encryption method of a communication supported by a communication relay apparatus;
a method determination unit configured to determine whether the obtained information of the encryption method of the communication relay apparatus indicates that an encryption strength of the encryption method satisfies the predetermined encryption strength; and
a control unit configured to, in a case where the setting unit performs the setting such that the setting is active, control the display of the display unit based on a determination result of the method determination unit,
wherein the control unit is configured, in a case where the setting is active, to control display unit to display a communication relay apparatus that adopts the encryption method of the communication that does not have the predetermined encryption strength, so as not to be allowed to be selected for establishing communication, and, in a case where the setting is inactive, to control the display unit to display a communication relay apparatus so as to be allowed to be selected for establishing communication, regardless of an encryption method of a communication adopted by the communication relay apparatus.

2. The information processing apparatus according to claim 1, wherein the one or more processors are further caused to operate as:
a detection unit configured to detect an electric wave intensity of the communication relay apparatus,
wherein the control unit performs the control in a manner that communication relay apparatuses, where it is determined that the encryption method has a predetermined encryption strength, are displayed on the display unit in a descending order of the detected electric wave intensity.

3. The information processing apparatus according to claim 1, wherein the one or more processors are further caused to operate as:
a strength determination unit configured to determine a strength of the encryption method,
wherein the control unit performs the control in a manner that communication relay apparatuses, where it is determined that the encryption method has a predetermined encryption strength, are displayed on the display unit in a descending order of the determined encryption strength.

4. The information processing apparatus according to claim 1, further comprising:
a storage configured to store a table in which an encryption method having a predetermined encryption strength is registered,
wherein, in a case where the obtained encryption method of the communication relay apparatus is registered in the table, the method determination unit determines that the encryption method includes the predetermined encryption strength.

5. The information processing apparatus according to claim 1, further comprising:
a storage configured to store a table in which an encryption method that does not have a predetermined encryption strength is registered,
wherein, in a case where the obtained encryption method of the communication relay apparatus is not registered in the table, the method determination unit determines that the encryption method includes the predetermined encryption strength.

6. The information processing apparatus according to claim 1,
wherein, in a case where the method determination unit determines that the encryption methods of all the plurality of communication relay apparatuses do not have a predetermined encryption strength, the control unit displays information on the display unit indicating an operation procedure used to establish a communication with a communication relay apparatus.

7. The information processing apparatus according to claim 1,
wherein the control unit sets a display format of another communication relay apparatus to be different from a display format of a communication relay apparatus determined to have a predetermined encryption strength and displays the communication relay apparatus determined to have the predetermined encryption strength on the display unit more preferentially than the another communication relay apparatus.

8. The information processing apparatus according to claim 7,
wherein the control unit displays the another communication relay apparatus set to have the different display format so as not to be selectable.

9. The information processing apparatus according to claim 7,
wherein the control unit does not display the another communication relay apparatus on the display unit.

10. The information processing apparatus according to claim 1,
wherein the communication relay apparatus supports an encrypted wireless communication and is an access point in the encrypted wireless communication.

11. The information processing apparatus according to claim 1,
wherein the control unit performs the control to display, on the display unit, a communication relay apparatus determined to have a predetermined encryption strength from among the plurality of communication relay apparatuses in such a format that a user can select a communication relay apparatus and display, on the display unit, the communication relay apparatus determined not to have the predetermined encryption strength in such a format that the user is not allowed to select the communication relay apparatus.

12. The information processing apparatus according to claim 11,
wherein the control unit performs the control to display, on the display unit, the plurality of communication relay apparatuses in a predetermined order and display, on the display unit, the communication relay apparatus determined not to have the predetermined encryption strength following display of a communication relay apparatus determined to have the predetermined encryption strength.

13. The information processing apparatus according to claim 1, wherein
the setting unit is configured to perform a setting up of a wireless LAN and a communication relay apparatus selected from among the plurality of communication relay apparatuses displayed on the display unit.

14. An information processing method of controlling an information processing apparatus including a display configured to display a plurality of communication relay apparatuses so as to be selectable, the information processing method comprising:
perform a setting that prohibits use of an encryption method for communication that does not have a predetermined encryption strength such that the setting is active or inactive;
obtaining information regarding an encryption strength of an encryption method of a communication supported by a communication relay apparatus;
determining whether the obtained information of the encryption method of a communication relay apparatus indicates that an encryption strength of the encryption method satisfies the predetermined encryption strength; and
controlling, in a case where the setting is set as active, display based on determining whether the obtained information of the encryption method of a communication relay apparatus includes the set predetermined encryption strength,
wherein, in a case where the setting is active, displaying a communication relay apparatus that adopts the encryption method for communication that does not have the predetermined encryption strength so as not to be allowed to be selected for establishing communication, and, in a case where the setting is inactive, displaying a communication relay apparatus so as to be allowed to be selected for establishing communication, regardless of an encryption method for communication adopted by the communication relay apparatus.

15. A non-transitory computer-readable storage medium that stores computer executable instructions for causing an information processing apparatus including a display configured to display a plurality of communication relay apparatuses so as to be selectable to execute an information processing method comprising:

perform a setting that prohibits use of an encryption method for communication that does not have a predetermined encryption strength such that the setting is active or inactive;

obtaining information regarding an encryption strength of an encryption method of a communication supported by a communication relay apparatus;

determining whether the obtained information of the encryption method of a communication relay apparatus indicates that an encryption strength of the encryption method satisfies the set predetermined encryption strength; and controlling, in a case where setting is set as active, display based on determining whether the obtained information of the encryption method of a communication relay apparatus includes the set predetermined encryption strength, wherein, in a case where the setting is active, displaying a communication relay apparatus that adopts the encryption method for communication that does not have the predetermined encryption strength so as not to be allowed to be selected for establishing communication, and, in a case where the setting is inactive, displaying a communication relay apparatus so as to be allowed to be selected for establishing communication, regardless of an encryption method for communication adopted by the communication relay apparatus.

* * * * *